(12) United States Patent
Hart et al.

(10) Patent No.: US 6,192,061 B1
(45) Date of Patent: Feb. 20, 2001

(54) RF EXCITED WAVEGUIDE LASER

(75) Inventors: Richard A. Hart, N. Granby; John T. Kennedy; Eric R. Mueller, both of West Suffield; Leon A. Newman, Glastonbury, all of CT (US)

(73) Assignee: Demaria Electrooptics Systems, Inc., Bloomfield, CT (US)

( * ) Notice: Under 35 U.S.C. 154(b), the term of this patent shall be extended for 0 days.

(21) Appl. No.: 09/039,036

(22) Filed: Mar. 13, 1998

Related U.S. Application Data

(60) Provisional application No. 60/041,092, filed on Mar. 14, 1997.

(51) Int. Cl.[7] .................................................... H01S 3/097
(52) U.S. Cl. ................................ 372/87; 372/64; 372/107
(58) Field of Search .................................. 372/55, 87, 96

(56) References Cited

U.S. PATENT DOCUMENTS

| | | | |
|---|---|---|---|
| 4,064,465 | * 12/1977 | Hundstad | 331/94.5 |
| 4,438,514 | 3/1984 | Chenausky et al. . | |
| 4,493,087 | * 1/1985 | Laakman | 372/64 |
| 4,577,323 | 3/1986 | Newman et al. . | |
| 4,787,090 | 11/1988 | Newman et al. . | |
| 4,807,232 | * 2/1989 | Hart | 372/18 |
| 4,807,233 | * 2/1989 | Hart | 372/18 |
| 4,807,234 | * 2/1989 | Hart | 372/18 |
| 4,837,769 | 6/1989 | Chandra et al. . | |
| 4,870,654 | * 9/1989 | Cantoni | 372/93 |
| 4,956,847 | * 9/1990 | Terai | 372/87 |
| 5,321,717 | * 6/1994 | Adachi | 372/108 |
| 5,353,297 | 10/1994 | Koop et al. . | |
| 5,467,362 | 11/1995 | Murray . | |
| 5,508,851 | * 4/1996 | Tachizawa | 359/822 |
| 5,663,980 | * 9/1997 | Adachi | 372/108 |

* cited by examiner

Primary Examiner—Teresa M. Arroyo
Assistant Examiner—Gioacchino Inzirllo
(74) Attorney, Agent, or Firm—Cantor Colburn LLP

(57) ABSTRACT

A clamping device for an RF excited laser is provided which reduces stress on ceramic components and also is less expensive than existing clamping devices. The RF excited laser lacking an electrode over the waveguide channel intersection regions. Ceramic covers are provided over a portion of these channel intersection regions to reduce plasma build up. Increased power is achieved by adding a fourth channel to a conventional waveguide to form a ring resonator. The optical component mount uses radial compressive forces to hold the optical component to a post, thereby preventing the face of the optical component from being distorted. Mirror mounts are also configured to allow more mirrors to be mounted at each end of the laser. The waveguide channel of the RF excited laser having a U-shaped cross section and an aspect ratio grater than one-to-one, which improves laser performance. A beam redirection device allows the laser head to serve as a mounting surface for other optical components. Anamorphic beam expander prisms are provided to charge the laser beam diameter and recollimate the laser beam. Relief holes or slots are provided in the waveguide to relieve pressure build-up with the channels on the waveguide.

54 Claims, 16 Drawing Sheets

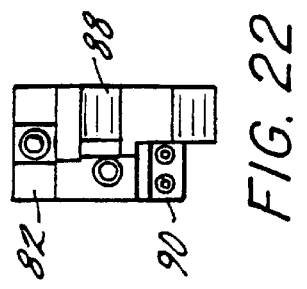
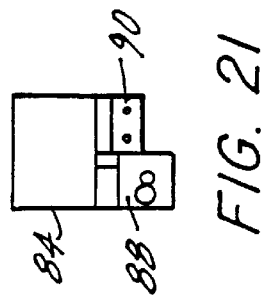
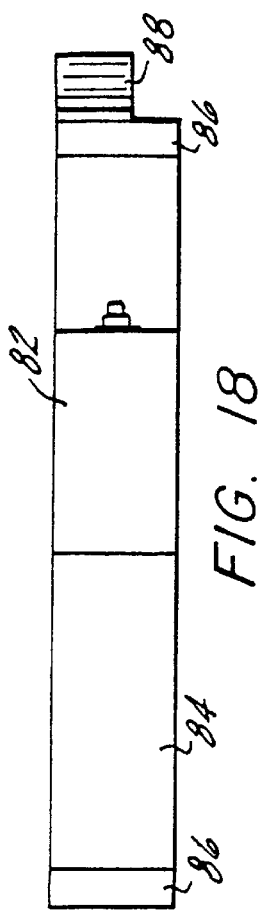
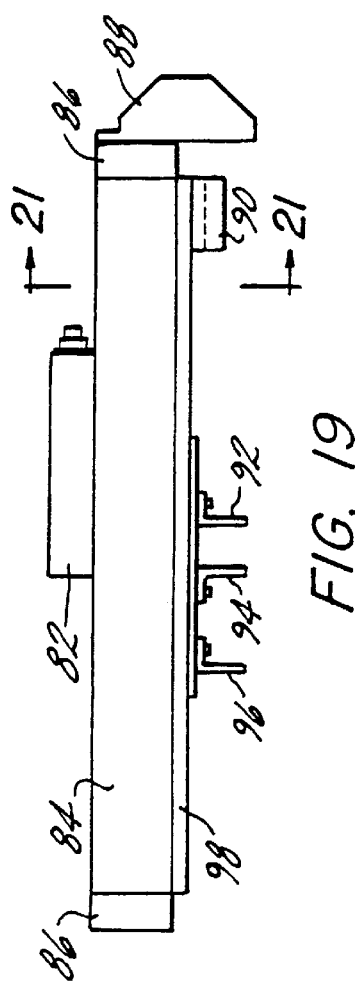
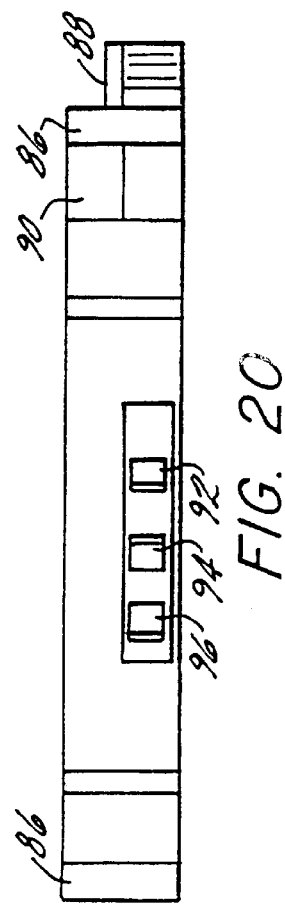

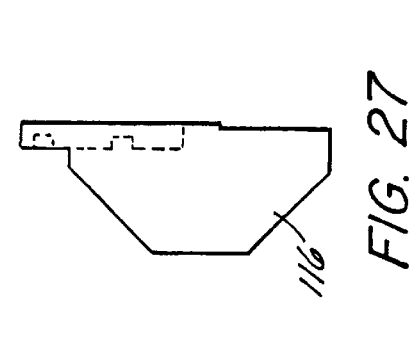
FIG. 24
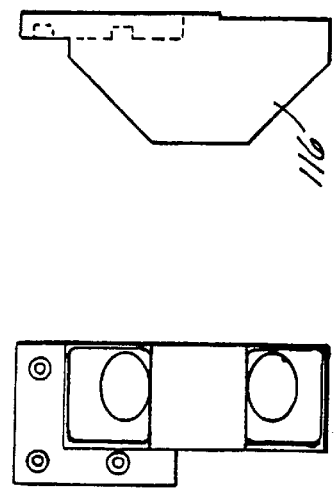
FIG. 25
FIG. 26
FIG. 27
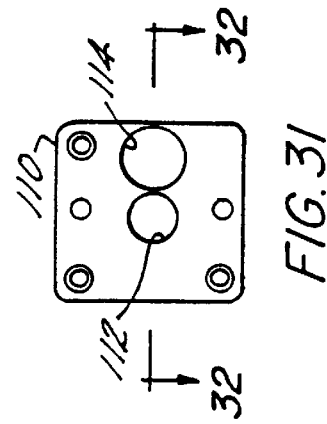
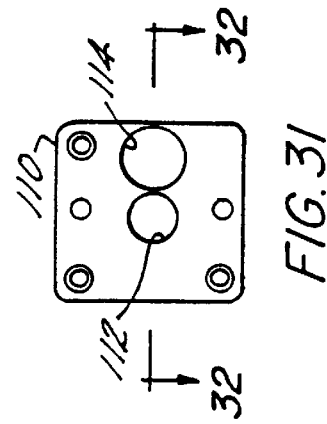
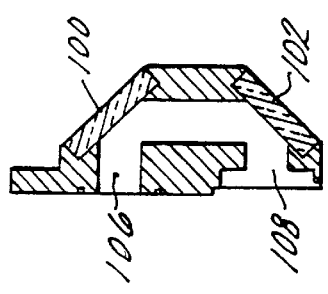
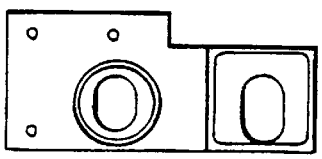
FIG. 28
FIG. 29
FIG. 30
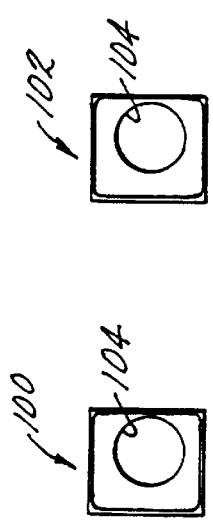
FIG. 31
FIG. 32

RF EXCITED WAVEGUIDE LASER

CROSS REFERENCE TO RELATED APPLICATIONS

This application claims the benefit of U.S. provisional patent application No. 60/041,092 filed Mar. 14, 1997.

BACKGROUND OF THE INVENTION

1. Field of the Invention

The invention relates in general to RF excited waveguide lasers and in particular to improvements to RF excited waveguide laser components.

2. Prior Art

In general, RF excited waveguide lasers having a distributed inductance are known. Referring to prior art FIG. 1, a conventional RF laser disclosed in U.S. Pat. No. 4,787,090 ('090) is shown. The '090 patent discloses a distributed inductance RF excited waveguide arrangement which is inserted into a metal housing structure which serves as both the vacuum housing and the structure to support resonator mirrors. The '090 patent teaches clamping the inserted assembly within this housing structure by deforming one surface of the structure with an external clamping plate. It has been found in practice that this clamping approach has a number of problems which adversely effect the laser's integrity and performance. For example, the clamping force is difficult to control which has resulted in clamping forces that are so large that fracture of the internal ceramic waveguide structure has occurred. In addition, this clamping arrangement requires that one surface of the vacuum housing be very thin so that it can be deformed by the clamping plate. This results in a reduction of the stiffness of the housing thereby compromising the optical alignment stability of the laser.

Referring to prior art FIGS. 2 and 3, a conventional folded waveguide which uses a common electrode to excite a gas discharge within a Z-fold optical waveguide structure so that a gas discharge is obtained in all the channels, is shown. The waveguide comprises a ceramic substrate 4 with waveguide channels 6 formed therein. Metal electrodes 8 are placed on either side of the ceramic substrate 4. RF energy applied to this configuration results in a plasma discharge within the waveguide. It has been discovered that the plasma formed in the intersection regions 12 of the waveguide channels is characterized by a substantially higher current flow compared to the normal waveguide region resulting in a relatively hotter and more intense plasma in this region. This non-uniform gas discharge condition results in a decrease in laser conversion efficiency and in some cases sputtering of the electrode in this region.

Turning to prior art FIG. 4, a conventional waveguide Z-fold resonator configuration which incorporates a U-bore waveguide slab is shown. The phrase "Z-fold" refers to the arrangement of the waveguide channels 6 in a Z pattern (i.e., the three waveguide channels, each passing across the waveguide). Reflecting mirrors 11 are positioned adjacent to channels 6. The output laser beam is emitted through a transmitting mirror 13.

Referring to prior art FIG. 5, an end view of waveguide channels used in conventional waveguides is shown. As is shown, conventional waveguide channels have circular, square and U-shaped cross sections. Each of the channels has an aspect ratio (ratio of height to width) of approximately one-to-one.

Mirrors 11 and 13 (FIG. 4) positioned at the end of each waveguide channel are mounted on optical mounts that must satisfy a number of simultaneous requirements. First, the angular alignment of the mirror must be accomplished without compromising the vacuum integrity of the gas envelope, and second, the alignment should be stable over a wide range of environmental conditions. Additionally, in higher power lasers, the mount should remove excess heat from the mirror's optic substrate to minimize potential damage and surface figure distortions which, if left uncorrected, will lead to a loss of performance and reduced reliability. Fastening the resonator optic to the mount while maintaining angular stability and maintaining a low thermal resistance without distorting the surface figure is also critical, yet difficult to achieve. Finally, to be commercially useful, the cost must be low enough to make economic sense for the application and market being addressed.

Referring to prior art FIG. 6, a cross-sectional view of a conventional gas laser resonator transmitting mirror mount which utilizes a metal post 14 having a transmitting mirror 16, is shown. A flexure arrangement 17 about the flexing point effects an angular movement through the vacuum envelope. The mirror mount is bolted onto a laser housing (not shown) by mounting bolts 19 as is well known. A hermetic seal with the mirror and the laser housing is obtained by "o" rings 21 and 23, respectively. Angular movement of the mount is accomplished through the use of fine threaded adjustment screws 18 located outside the vacuum envelope. The screws in turn apply an angular force to post 14 which is usually monolithic with and hermetically sealed to the laser housing (not shown), as described above. In many applications, four adjusting screws 18 induce orthogonal angular movement but are not as stable as a three point mounting system. The transmitting mirror is held in compression against "o" ring 21 by a press-on cap 20.

The conventional method used to attach mirror 16 to post 14 has disadvantages. Transmitting mirror 16 (and high reflecting mirrors, not shown) is typically attached using press on cap 20 which applies an axial force to the mirror. For cooling purposes, firm intimate contact of the back side of the high reflection mirrors is required and shown in FIG. 7. The placement of press-on cap 20 creates forces in the axial direction of mirror 16 (as shown by the arrows F). This force often results in a deformation in a region 22 of the optic, thus ruining the mirror's surface figure. One approach to circumvent this problem is to mount the mirror against a classic three point contact on the end of the post. This approach, however, compromises the thermal aspects of the design.

SUMMARY OF THE INVENTION

The above-discussed and other drawbacks and deficiencies of the prior art are overcome or alleviated by the RF excited laser of the present invention. A clamping device is provided which reduces stress on ceramic components and also is less expensive than existing clamping devices. The electrode coverage of the waveguide intersection region is reduced or eliminated so as to reduce plasma build-up in this region. Ceramic covers are used over a portion of the channel intersection region in order to improve efficiency and mode quality. Increased power is achieved by adding a fourth channel to a conventional waveguide to form a "bow tie" (or "figure eight") shaped ring resonator. Fourth, fifth or more channels can be added to a conventional waveguide to form a W(or M) or combination WI (or NV or MI) or a larger number of Zig-Zag configuration waveguide. To accommodate these additional channels added to the standard Z shape waveguide structure, additional laser folding high reflecting folding mirrors are provided for propagating the laser beam through the channels of the folded waveguide. An improved optical component mount uses radial compressive forces to hold the optical component to a post. This prevents the face of the optical component from being distorted. Mirror mounts are also configured to allow more mirrors to be mounted at each end of the laser. A waveguide channel having a U-shaped cross section and an aspect ratio greater than one-to-one improves laser output power performance without adding more complexity to a laser waveguide design. A beam redirection device allows the laser head to serve as a mounting surface for other optical components. For rectangular shaped laser beams emitted by a waveguide having an aspect ratio greater than one-to-one a cylindrical lens is placed at the point where the dimensions of the x, y axis of the laser beam are the same coupled with a two lens telescope maintains a circular beam and provide an ability to change the beam diameter. An alternative approach is the use of anamorphic beam expander prisms to change the laser beam diameter and recollimate the laser beam in a compact and rugged package. Relief holes or slots are provided in the waveguide to relieve acoustic resonances built-up within the channels of the waveguides under pulsed gas discharge conditions.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 18 is a top view of a laser head used as a mounting surface for other optical components;

FIG. 19 is a side view of the laser head of FIG. 18;

FIG. 20 is a bottom view of the laser head of FIG. 18;

FIG. 21 is a cross sectional view taken along line 21—21 of FIG. 19;

FIG. 22 is an end view of the laser head of FIG. 18;

FIG. 24 is a front view of a beam redirection device used with the laser head shown in FIG. 18;

FIG. 25 is a cross-sectional side view of the beam redirection device of FIG. 24;

FIG. 26 is a rear view of the beam redirection device of FIG. 24;

FIG. 27 is a side view of the beam redirection device of FIG. 24;

FIG. 28 is a cross-sectional end view of the beam redirection device of FIG. 24;

FIG. 29 is a front view of a first mirror mount used with the laser head shown in FIG. 18;

FIG. 30 is a front view of a second mirror mount used with the laser head shown in FIG. 18;

FIG. 31 is a front view of a third mirror mount used with the laser head shown in FIG. 18;

FIG. 32 is a cross-sectional view taken along line 32—32 of FIG. 31;

DETAILED DESCRIPTION OF THE INVENTION

Figure 8:
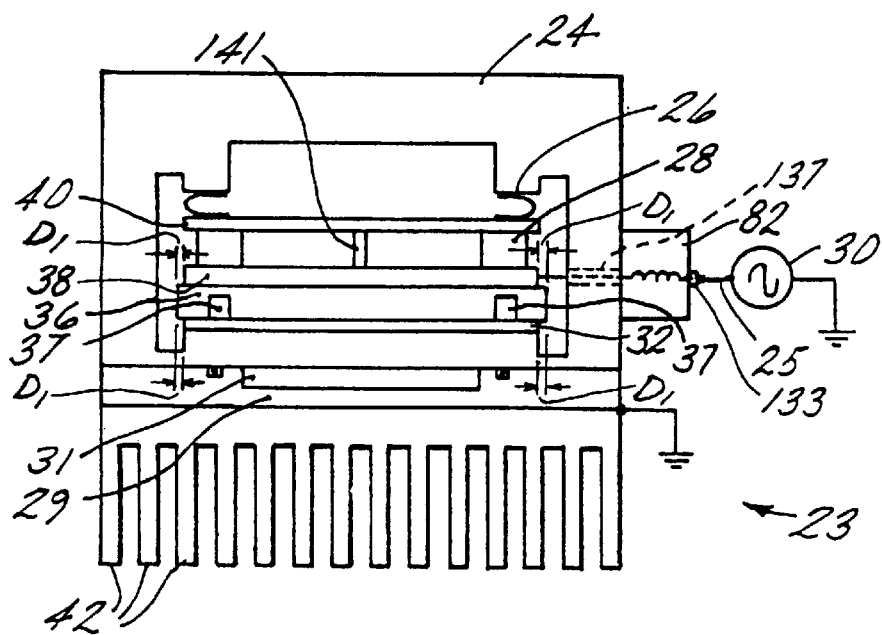
FIG. 8 is an end view of a clamping arrangement with an end assembly removed in accordance with the present invention.

Referring to FIG. 8, an improved clamping arrangement which eliminates the problems associated with the prior art clamping plates is generally shown. A laser head (or device) 23 has a one piece metal housing 24 which also acts as an electrical ground for the laser head. A metal electrode 38 and a non-oxygen depleting, non-particulate generating metal electrode 32 in electrical contact with the metal housing 24 having a ceramic waveguide 36 disposed therebetween are positioned within housing 24. Waveguide 36 has waveguide channels 37 defined therein. A RF power supply 30 is connected to electrode 38 by a co-axial cable 25 through a vacuumed sealed (hermetically sealed) RF connector 133 and a phase matching co-axial line 135 through a vacuumed sealed (hermetically sealed) RF connector 137. A coolant sealing plate 29 defining an internal cooling passage 31 is mounted to housing 24. Alternatively the internal cooling passage 31 could be located in housing 24 and be sealed off by plate 29. Ceramic waveguide 36 overhangs, by a prescribed distance "$D_1$" on all sides, electrodes 38 and 32, thereby preventing a discharge from forming between the edge of the top and bottom electrodes. This overhang of waveguide 36 (or indentation of electrodes 38 and 32) assures that the electrical resistance between the electrodes along the surfaces of the ceramic is greater than through the waveguide at all points.

Figure 1:
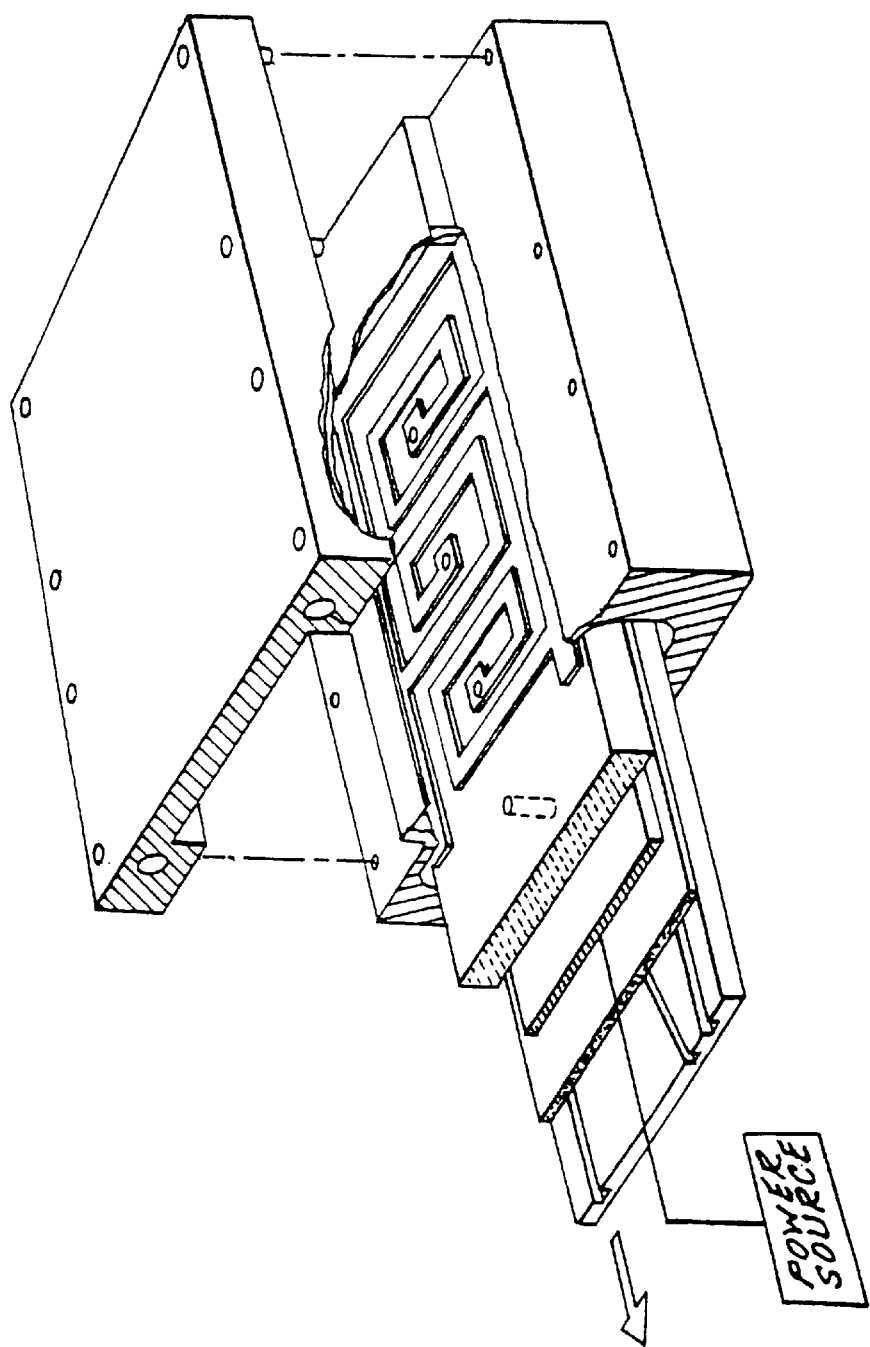
FIG. 1 is a partly exploded perspective view of a laser clamping arrangement in accordance with the prior art.

A distributed inductance assembly 40 as used in the prior art of FIG. 1 is positioned above electrode 38 by a ceramic spacer 28. One end of the distributed inductance assembly is electrically connected to electrode 38 by an electrical wire 141 at one end and at the other end by the metal c-spring 26, to the metal housing which serves as a electrical ground. Laser 23 employs a clamping scheme in which the external clamping plate used in the prior art, e.g. the clamping plate shown in FIG. 1, is eliminated. It is replaced by an arrangement consisting of a continuous C-spring 26 (made from a resilient material such as gold plated Beryllium Copper) in combination with ceramic spacer 28. The C-spring 26 provides both a well defined clamping force and a low inductance connection of the inductor assembly 40 to the metal housing 24. This arrangement provides a clamping force which is very uniform and has a magnitude which does not result in fracture of the ceramic components. Furthermore, this clamping arrangement does not require the thinning of the housing 24 thereby improving the stiffness and resulting alignment stability relative to conventional designs. In addition, ceramic spacer 28 is a simple, two piece component and has a lower cost than the ceramic component used in the prior art device shown in FIG. 1. Air cooling can be accomplished through metal fins 42 depending upon housing 24 (for low power lasers), fins 42 are preferably located at the bottom of the housing as shown, or by flowing a liquid or forced air through cooling passages 34 may be used for higher power lasers (40 W and greater), or by both as shown in the FIGURE.

In the prior art, aluminum is commonly used for the electrodes. Aluminum is a good material for this application because it is inexpensive and it has low electrical resistivity, high thermal conductivity, and forms a good oxide that stops oxygen depletion, it also has low propagation losses when used as a waveguide at wavelengths common to $CO_2$ lasers. Unfortunately, the thermal expansion coefficient of the native oxide formed on aluminum ($Al_2O_3$) is different from the thermal coefficient of the aluminum base substrate by approximately a factor of 3.5. Thermal cycling that occurs when the laser is turned on and off or when operated in a pulsed mode causes the oxide to fracture and shed particles. Since these particles occur directly within the high optical intensity waveguide of the lasers, these loose particles heat up and cause damage to the optical mirrors thereby deteriorating the performance of the laser. These heated particles result in poor reliability especially when the laser is operated in a vertical position or undergoing movement when it is being operated or transported from location to location.

To reduce this oxide flaking problem, the aluminum is normally anodized. The anodizing baths have to be maintained especially clean to prevent contamination of the laser gas medium when it out gases, thereby causing contamination of the laser gas mixture within the laser head housing. This special attention to the anodizing bath cleanliness adds to the expense of fabricating the laser. Additional expense is added by the additional heat processing required to out-gas the oxide deposited by the anodization process. The anodization reduces but does not eliminate the flaking problem of aluminum.

The present invention solves these problems by using titanium, instead of aluminum, for use in the non-oxygen depleting, non-particulate generating metal electrode shim plate 32 shown in FIG. 8. The oxidation and general corrosion resistance of titanium and its alloys are excellent at temperatures below 400° C. Titanium-aluminide alloys oxidation resistance is satisfactory below 800° C. This metal and its alloys form a tenacious surface oxide film in air that gives it an advantage for this application in spite of the fact that its thermal conductivity and RF resistivity is not as good as aluminum. Other suitable materials are gold and platinum, but their high costs prevent them from being used in bulk form. They can be cost effectively used in thin foil forms when the foil is placed only over the area of the metal electrode covering the waveguide. These materials can also be deposited in thin film form over the referenced electrode by well known thin film deposition techniques (evaporation, sputtering, etc.) and also are very oxidation/corrosion resistant.

The non-oxygen depleting, non-particulate generating metal electrode 32 can be in the form of a thin titanium sheet. By using a thin sheet of titanium, the temperature rise across this relatively low thermally conductive material is minimized thereby preventing excessive rise in the laser gas temperature. However the sheet must be thick enough to permit ease of handling. In an exemplary embodiment, the titanium shim electrode has a thickness of less than one-quarter of an inch.

Figure 2:
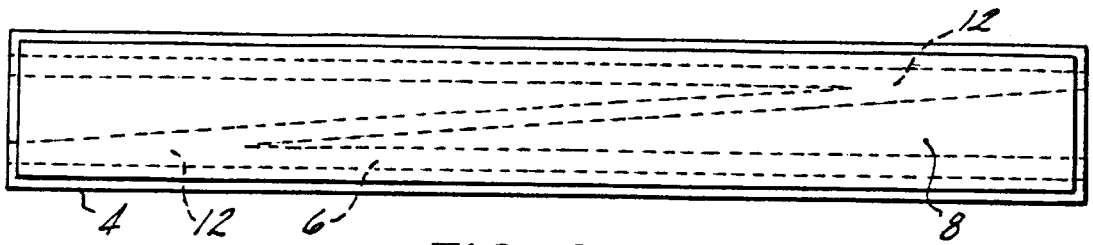
FIG. 2 is a top view of a waveguide including metal electrodes, in accordance with the prior art.
Figure 3:
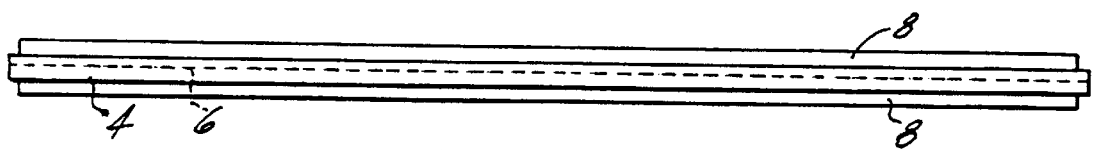
FIG. 3 is a side elevation view of the waveguide of FIG. 2.
Figure 4:
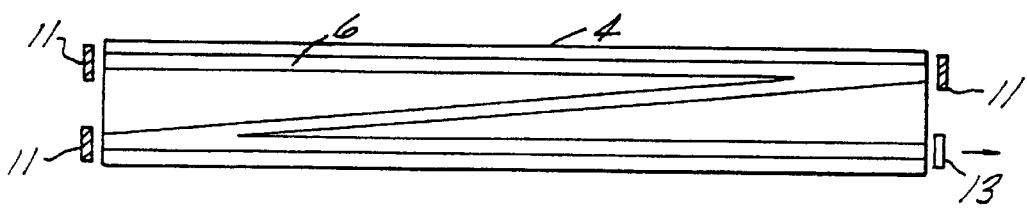
FIG. 4 is a top view of a waveguide illustrating the placement of mirrors adjacent the waveguide, in accordance with the prior art.
Figure 10:
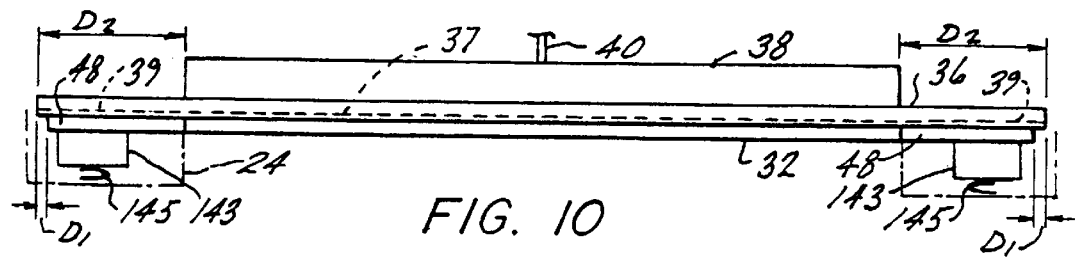
FIG. 10 is a side view of the waveguide of FIG. 9.
Figure 9:
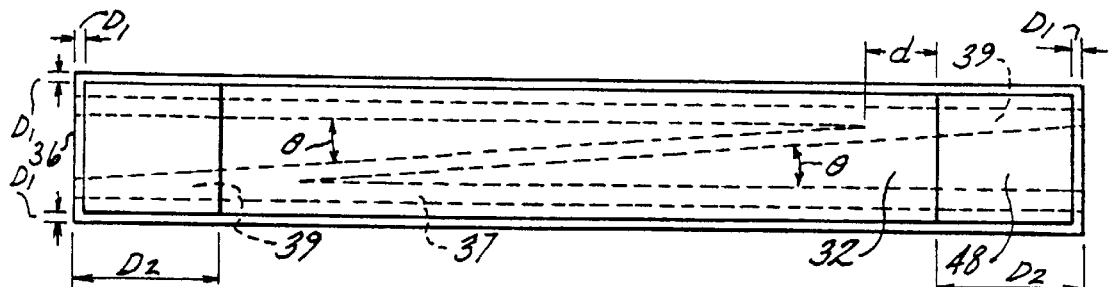
FIG. 9 is a bottom view of a waveguide including metal electrodes and ceramic covers in accordance with the present invention.

Referring to FIGS. 9 and 10, ceramic waveguide 36 is shown with an arrangement of waveguide channels 37 disposed at an oblique angle, θ, disposed between electrodes 38 and 32, in accordance with one embodiment and the present invention. As discussed with reference to prior art FIGS. 2 and 3 air excess plasma discharge occurs in waveguide channel intersection regions. The embodiment of FIGS. 8 and 9 has a relatively thick aluminum electrode 38 in contact with ceramic waveguide 36 and wherein RF electrical contact is made to the distributed inductance 40 by electrical wire 141. The use of a relatively thick electrode provides for conduction of heat away from ceramic waveguide 36 while also serving as the hot RF electrode. Titanium electrode 32 is in contact with the plasma in channels 37 at the bottom of the structure. Over a portion of each waveguide channel intersection, designated 39, a ceramic cover 48 can be used to continue the waveguide in that region, although it is not required. If used, the ceramic cover is held in place by a ceramic support 143 and a compressed spring arrangement 145. By not having the metal electrodes 32 and 38 cover the entire channel intersection region 39 results in plasma within the intersection region occupying less than 80% of the total intersection area. In a preferred embodiment, the metal electrode 32 and 38 extend into each channel intersection region 39 (a distance designated "d" in FIG. 9) by a length that is approximately equal to the width of the waveguide channel 37 dimension in the non-intersection region. This eliminates the hot intense plasma in intersection region 39 and also, results in, highly uniform pumping, improved laser efficiency and improves laser lifetime. Ceramic covers 48 are placed over the portion of the channel intersection region 39, not covered by the metal electrode 32 as designated by the letter "$D_2$." The ceramic continues the waveguide thereby also improving the mode quality of the laser. These arrangements result in the movement of the plasma away from the folding resonator optics which has a beneficial impact on laser lifetime.

In an alternative embodiment, ceramic covers 48 are removed, leaving a portion of the channel intersection region 39 uncovered. There is no power decrease by removing the ceramic covers 48, however, a slightly better mode quality is obtained if a ceramic cover 48 is placed over the waveguide intersection region not covered by the metal electrode 32.

Figure 11:
FIG. 11 is a diagrammatic top view of a "bow tie" or "figure eight" shaped waveguide for a ring laser cavity configuration in accordance with the present invention.
Figure 39:
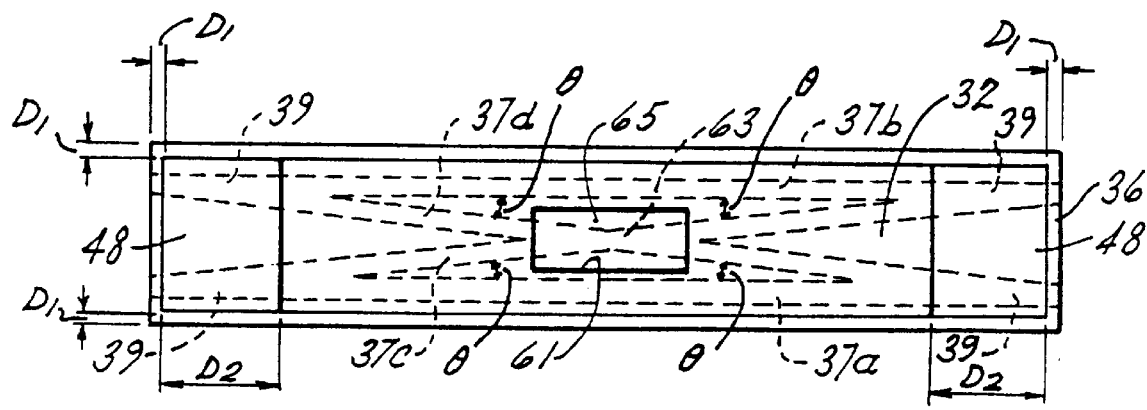
FIG. 39 is a bottom view of a ring waveguide including metal electrodes and ceramic covers over the waveguides intersection region, in accordance with the present invention.

Referring to FIG. 11, ceramic waveguide 36 is shown with an alternate arrangement of waveguide channels 37. These waveguide channels 37a–d are arranged to define a "bow tie" or "figure eight" ring resonator configuration. Thus, there are two waveguide channels 37a and 37b that are substantially parallel, a third waveguide channel 37c which intersects the first and second waveguide channels 37a and 37b at an oblique angle θ and a fourth waveguide channel 37d that intersects the first and second waveguide channels 37a and 37b at an oblique angle θ. Reflecting mirrors 45,47 and 49 and partially reflecting mirror 51 are displaced a distance "$D_3$" from the ceramic waveguide 36 and guide a beam through channels 37a–d. Mirror 51 is partially transmittive to provide an output laser beam from the waveguide. Further, a fifth mirror 52 is placed near the output of the waveguide to feedback into the optical resonator the undersized second beam from the ring resonator, as is well known in the art. This arrangement produces unidirectional operation of the ring laser and yields one output beam, as is shown in FIG. 11. The ring resonator increase the laser's output power from the same physical size laser head by increasing the optical lengths of the laser gain medium. Adding the additional diagonal waveguide channel 37d to the waveguide arrangement of FIG. 9 to form a ring resonator results in about a twenty-five percent increase in output power. The long discharge length of the ring resonator shown in FIG. 11 also makes this configuration attractive as a laser amplifier. As is shown in FIG. 39, openings 61 located in the region of electrodes 32 and 38 that corresponds with the center intersecting waveguide region 63 of FIG. 11 reduces the discharge intensity in this intersection, as discussed for the channel intersection regions for FIG. 9 and as shown in FIG. 39. If electrode 32, is sufficiently thick, a matching opening indentation does not have to be provided in the metal laser housing supporting electrode 32. A ceramic cover 65 may be placed over region 63 at opening 61 similar covers 48.

Figure 6:
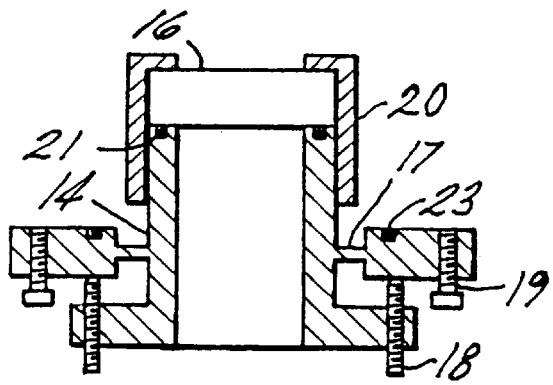
FIG. 6 is a cross sectional view of an optic mount in accordance with the prior art.
Figure 7:
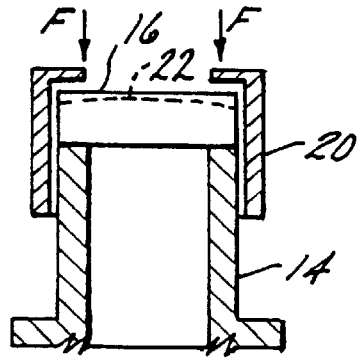
FIG. 7 is a side view of a device for mounting an optic to a conventional optic mount, in accordance with the prior art.
Figures 12A, 12B, 12C:
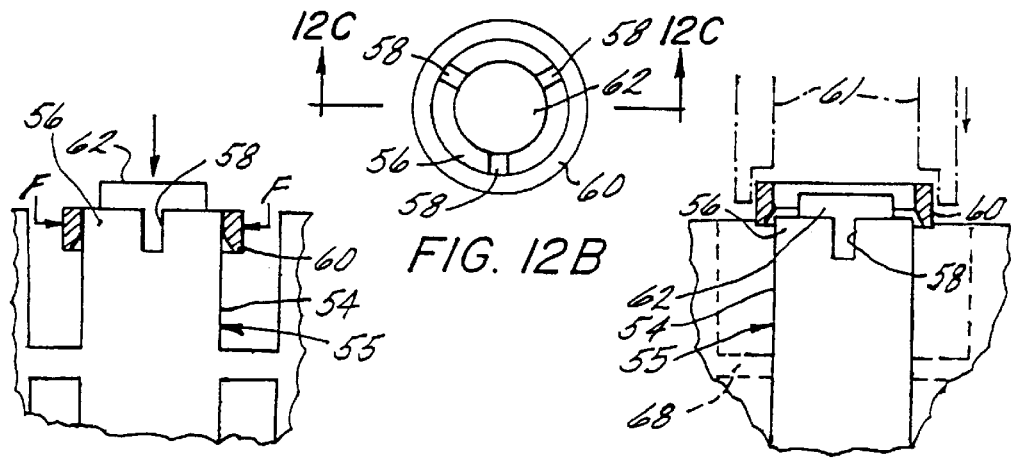
FIG. 12 is a side view of an optical component mount in accordance with the present invention.
Figure 33:
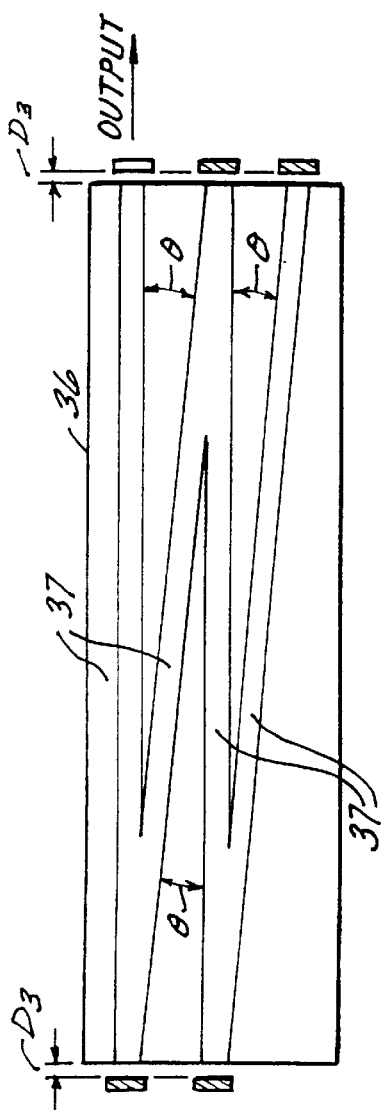
FIG. 33 is a top view of a W shaped waveguide in accordance with the present invention.
Figure 34:
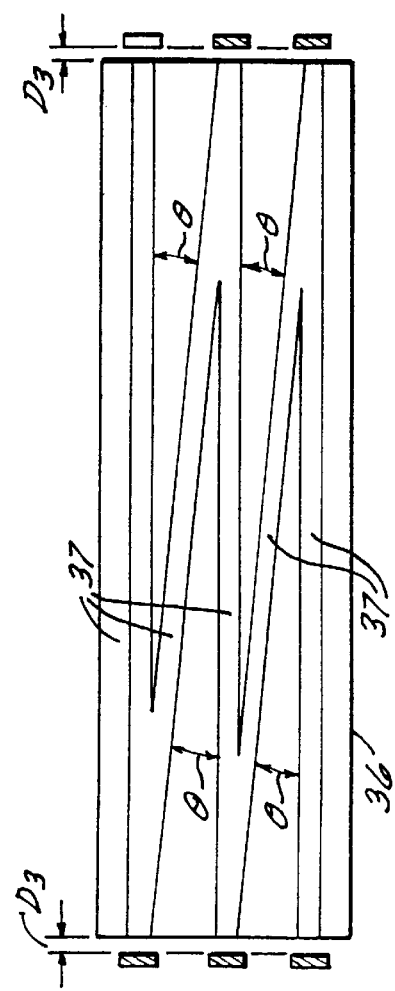
FIG. 34 is a top view of a WI or NV shaped waveguide in accordance with the present invention.

Referring to FIGS. 12A–C, an improved optical mount in accordance with the present invention is generally shown at 55 for the highly reflecting mirror. Optical mount 55 is made up of a post 54 having a plurality of spaced tabs 56 extending away from the post 54 and parallel to the longitudinal axis of the post 54. An optical component (e.g. a reflecting or transmitting mirror) is placed on an end of the post 54 and is surrounded by tabs 56 separated by spaces 58. A compression ring 60 is then placed around the tabs and driven by an appropriate tool 61 along the longitudinal axis of the post. This forces the tabs 56 towards the optical component 62 and secures the optical component to the post 54. The forces on the optical component 62 are in the radial direction as shown by the arrows labeled "F" in FIG. 12A. Accordingly, deformation of the surface of the optic component 62 is minimized. Optical mount 55 may be incorporated in an end wall member which seals the end of the laser. Further, multiple optical mount 55 may be employed in a single end wall of the laser, for example, in folded resonator lasers such as shown in FIGS. 11, 33, and 34. In previous designs, (FIGS. 6 and 7) the resonator mirrors were usually attached using a press on cap which applied an axial force to the optic. For cooling purposes, firm intimate contact of the back side of the optic is required. Unfortunately without very careful preparation of all mounting surfaces, deformation of the substrate will result, ruining the optic's surface figure. One approach used to circumvent this problem has been to mount the optic against a classic three point contact on the end of the post. This approach, however, compromises the thermal aspects of the design.

These problems are overcome by optical mount 55, as the retaining forces applied to the optical component, e.g., mirror 45, 47, 49 or 51, by the mount are applied radially rather than axially and this force is applied well behind the front surface of the optical component. As described hereinbefore with reference to prior art FIG. 7, axial forces that are not applied evenly across the face of an optical component results in deformation of it's surface. Radial loads on the other hand, as shown in FIG. 12A, are applied parallel to the plane of the surface of the optical component and therefore have a much smaller effect on it's surface. In addition, the radial gripping force is applied well in back of the front surface of the optical component further isolating the deforming forces from the front surface of the optical component. From a thermal design aspect, the greatest thermal resistance occurs at the boundary between the optical component and post 54 and is minimized as the interface area is increased, the surface finish is improved and the coupling load is increased. The optical mount of the present invention improves thermal conduction of the optical component because the area of contact and the coupling lead can be greater than what can be achieved with the prior art method of mounting. From a cost stand point, much less surface preparation and skill is required, to effectively secure the optic to the mount without distortion. The optical mount 55 is machined directly into the mirror housing assembly 55 as illustrated in FIGS. 13–16.

Referring to FIGS. 13–15 and 16, a mirror housing assembly 65 employing two optical mounts 55 is shown. A plurality of optical mounts 55 may be machined into a one piece mirror housing assembly to provide the reflective surfaces at each end of a waveguide. The orientation of post 54 (and thereby optical component 62) is adjusted using set screws 66. Thereby tilting the post about the flexing point 68 shown in FIG. 16. The flexing point consists of a web of material 68 and also serves to isolate the interior of the laser head from the outside air and allows post 54 to flex.

A groove 70 (FIG. 15) is formed in the face of the mirror housing assembly with a gasket 72 provided to form a vacuum seal between the mirror housing assembly and the laser head assembly. An indium wire can be used, for example, as the gasket to form a metal to metal seal between the mirror housing assembly and a laser head assembly. It is understood that other metals may be used to form the gasket. Metal to metal sealing is preferred for hermetical seals instead of rubber gaskets because of out gassing problems associated with rubber gaskets which contaminates the laser gas and limits the operating life time of the laser.

Figure 15:
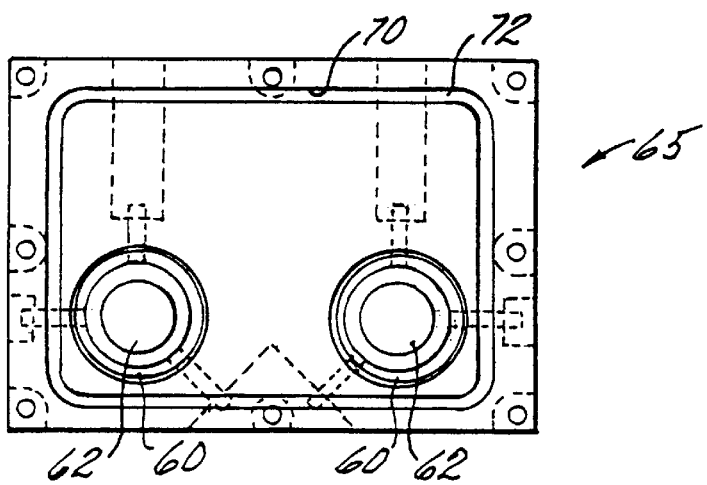
FIG. 15 is a front view of the mirror housing assembly of FIG. 13.
Figure 16:
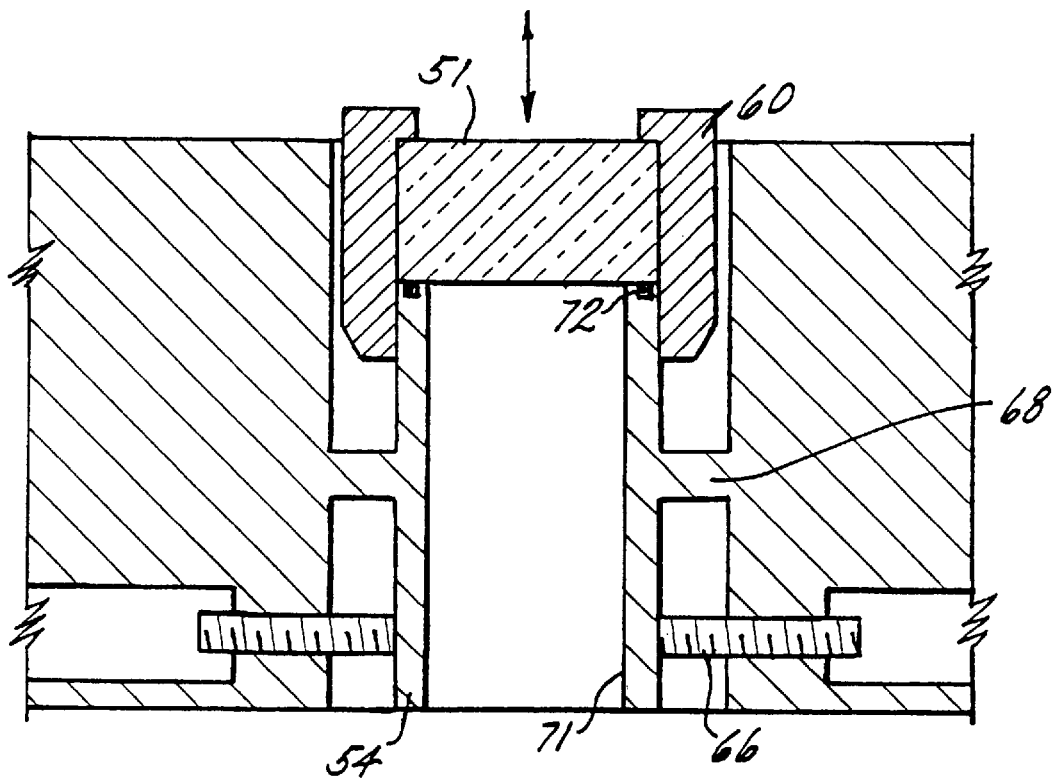
FIG. 16 is a cross sectional view of a mounting device for a high reflectivity mirror in accordance with the present invention.

Referring to FIG. 16, for the partially reflecting mirror 51, through which the laser beam is extracted, a hole 71 is drilled through the post 54 of the mirror mount, whereby an opening is formed therethrough to allow the laser beam to travel through the post. Compression ring 60 holds mirror 51 to the post 54. Gasket 72 prevents the interior of the laser head from being contacting the ambient air on the outside of the laser head. The position of post 54 is adjusted in the same fashion as described hereinbefore with respect to the posts shown in FIGS. 13–15, through set screws 66.

Figure 5:
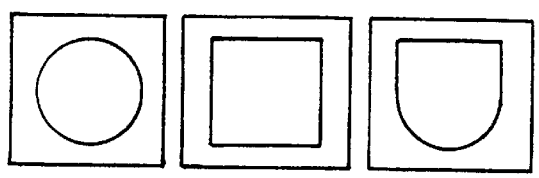
FIG. 5 is an end view of channels used in a waveguide, in accordance with the prior art.
Figure 17:
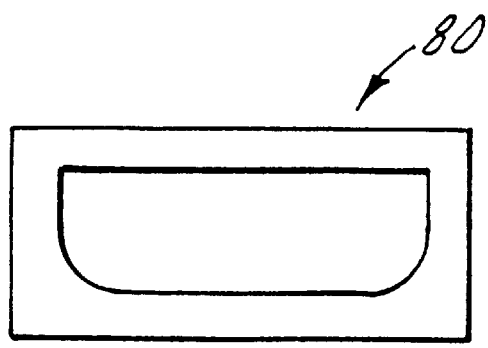
FIG. 17 is an end view of a waveguide channel in accordance with the present invention.

Referring to FIG. 17, an end view of waveguide channel 37 in accordance with the present invention is generally shown. Waveguide channel 37 has an aspect ratio greater than one-by-one (the aspect ratio of the prior art waveguide channels, see, e.g., FIG. 5). For a given waveguide length, such a rectangular waveguide increase the laser gain volume in order to obtain higher output power. This approach is preferred over increasing both x, y dimensions of a square guide because it provides better mode discrimination and better gas cooling. The waveguide channel cross section of FIG. 17 improves the discrimination of high order modes over a very wide high aspect ratio, such as a slab discharge configuration. The waveguide is easily fabricated and it's asymmetric cross section strongly discriminates against the higher order modes normally encountered with traditional prior art lasers utilizing either slab or large round or square cross sectioned waveguide channels (FIG. 5). In the present invention, a U-shaped waveguide channel is expanded in width to form a wide aspect ratio greater than one-by-one, e.g., 4.57 mm×2.79 mm. In this exemplary embodiment (FIG. 17), the aspect ratio is approximately a two-by-one aspect ratio which maintains a lowest order transverse mode with a single central on axis field maxima without additional lobes. All resonator optics used in the resonator are flat, consistent with the flat wave front associated with a waveguide resonator.

For the case where a one-by-one aspect ratio waveguide is used, the output laser beam has essentially the diameter of the waveguide dimension. In many cases, the user wants a different beam diameter to fill the aperture of a specific optical system, such as an optical scanner. Consequently, optics are required to change the beam diameter and recollimate the laser beam. The beam diameter change can typically be accomplished in a reasonable length with a two lens telescope as is well known in the art. Such a two lens subsystem can be mounted directly on the laser head along with the optical scanner. This provides a rugged, cost and space effective design solution to such a need.

For the case where the width of the waveguide is larger than the height or where the height of the waveguide is larger than the width (aspect ratios greater than one-by-one), the diffraction angle of the laser beam is not identical for the two axes of the laser emitting aperture (i.e., the rectangular waveguide). The diffraction angle associated with the smallest and largest dimension of the waveguide have the largest and smallest diffraction angle respectively. This gives rise to a non-circular beam.

Figure 37:
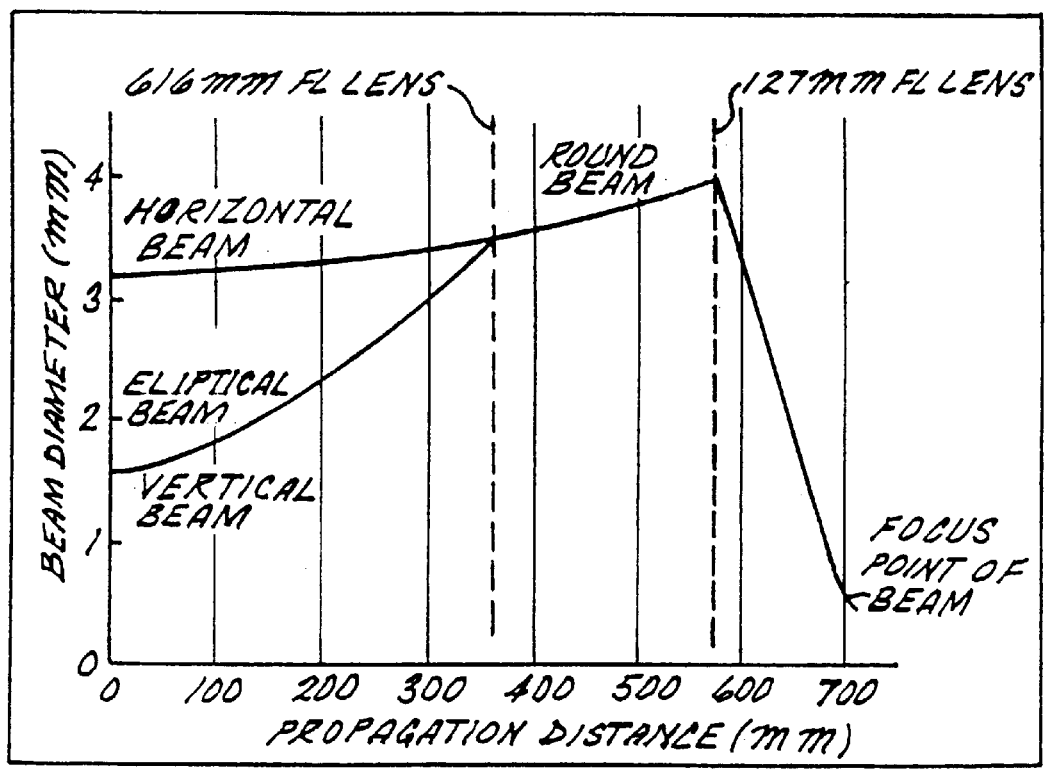
FIG. 37 is a plot resulting from an optical wave analysis illustrating the conversion of a rectangular laser beam having an aperture of 4.57 mm horizontal to 2.79 mm vertical to a circular laser beam with the placement of a cylindrical lens at the location where the vertical and horizontal dimensions of the laser beam are equal.

Referring to FIG. 37, a Guassian beam calculation of the spreading of the horizontal and vertical axises of a rectangular $CO_2$ laser beam emitted by an aperture of 4.57 mm width and 2.26 mm height as a function of distance away from the aperture is illustrated. As per diffraction physics, the narrow portion expands more rapidly than the wider portion of the beam. Based on Gaussian beam analysis, for the waveguide case that has a narrow vertical and a wider horizontal dimension, at an approximate distance of 380 mm away from the aperture, the vertical portion has spread sufficiently to match the dimension of the horizontal portion of the rectangular laser beam. At this point the resultant laser beam is circular. For the aperture used in FIG. 37, this circular shape can be maintained from the distance outward by placing a cylindrical lens having a 616 mm focal length at this spot which converts the diffraction angle of the vertical portion of the beam to equal the horizontal portion of the beam. The beam then propagates with a diffraction angle equal to the horizontal portion of the beam, with this approach, the cylindrical lens yields no astigmatism which is not obvious from a geometric optics analysis. This is a low cost, low optical loss and compact solution for obtaining a circular beam from a rectangular waveguide laser. A focusing lens can then be placed to focus the laser beam to a spot for performing ablation, cutting, drilling, etc. type material processing/working. As an example, FIG. 37 illustrates the placement of a 127 mm focal length lens at 575 mm distance from the laser aperture to obtain a focused spot for the desired application. The cylindrical lens and the focusing lens can be mounted directly on the laser head as shown in FIGS. 19 and 20.

A two lens telescope, as is well known in the art, can be inserted after the cylindrical lens to either increase or decrease the diameter of the laser beam to achieve the desired diameter of the laser beam. In addition, the distance between the cylindrical lens and the focus lens is sufficient for also including additional optical components, such as a scanner, a focusing lens or turning mirrors. To preserve compactness, all these optical components can be mounted directly on the laser head as discussed hereinafter. Such a three lens optical system mounted on the laser head that serve as an optical bench is a low cost, low loss and compact solution for obtaining a circular laser beam of the desired diameter from a rectangular waveguide for those applications where a round beam having a specific diameter is desired by the user.

For the rectangular waveguide example, a three lens beam correction arrangement, as is well known in the art, can be used to obtain a round beam with the desired beam diameter within a reasonably short distance to feed into the desired optical subsystem aperture, such as an optical scanner. Such a three lens subsystem can be mounted directly on the laser head along with the optical subsystem such as an optical scanner.

Figure 13:
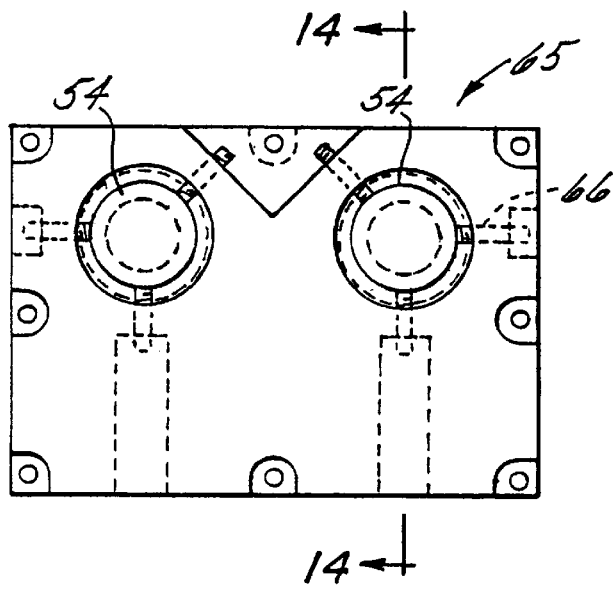
FIG. 13 is a rear view of a mirror housing assembly in accordance with the present invention.
Figure 14:
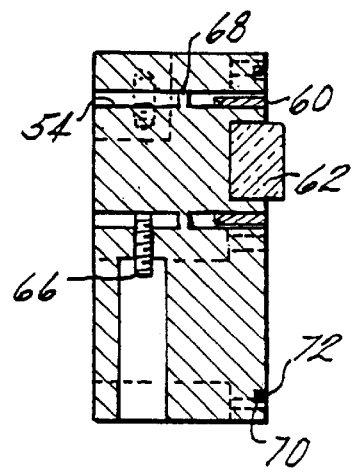
FIG. 14 is a cross sectional view taken along line 14—14 of FIG. 13.

Turning to FIGS. 18–23, device 23 is shown as a mounting device for beam shaping optics, turning mirrors and optical deflectors such as acoustic-optics, vibrating mirror type scanners (i.e., galvanometers type scanners) and motor driven rotating mirrors. As shown in FIG. 18, laser head 23 has attached to it an RF connector and an RF phase adjustment unit 82. Unit 82 (FIG. 8) allows the laser to be coupled to a variety of coaxial cables and RF power supplies with the laser head, cable and remote RF power supply being interchangeable. Unit 82 connects to co-axial cable 25 which in turn connects to the hermetically seal RF connector 133. This interchangeability is a highly desirable feature. On each end of laser head 23 are mirror housing assemblies 65 (FIGS. 13–15). Cooling port 90 provides for input and output of coolant that flows to internal cooling passages 31

Figure 23:
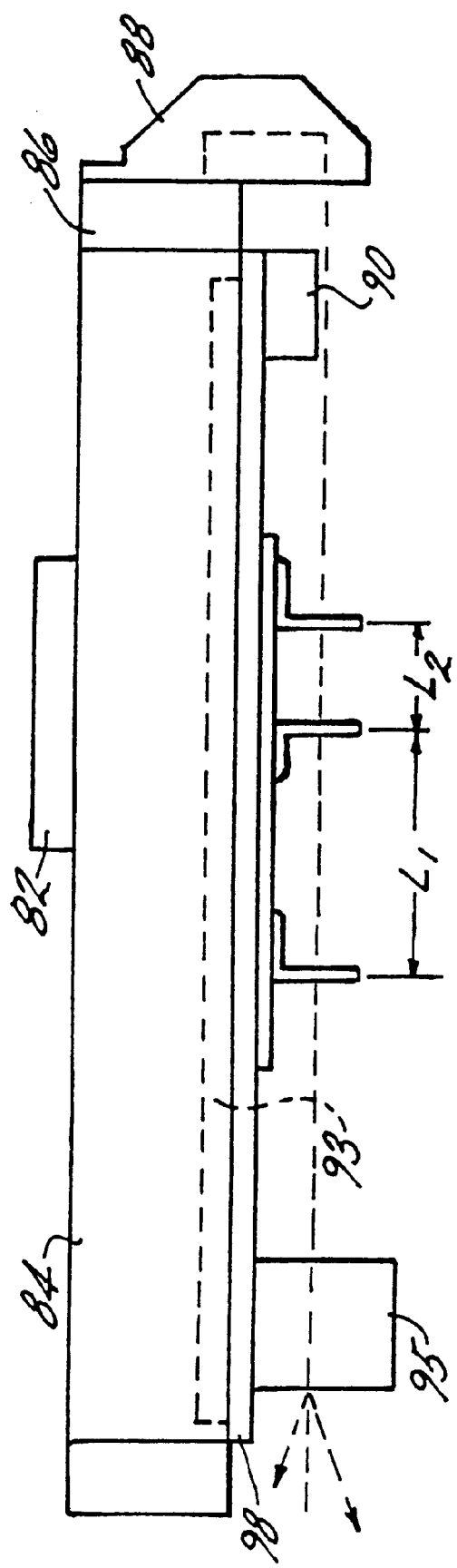
FIG. 23 is a side view of the laser head of FIG. 18 including and optical scanner.

(FIGS. 8 and 23). Coolant sealing plate 29 (FIG. 8) includes an o-ring seal (not shown) to prevent coolant from escaping laser head 23. Mirrors 45, 47, 49 and 51 are mounted in the mirror housing assemblies 65 and direct the laser beam through waveguide 36. A beam redirection device 88 is connected to the output of mirror housing assemblies 65 associated with mirror 51 and redirects the beam so that the beam exits the beam redirection device 88 substantially parallel to the laser head 23, as shown in FIG. 23. Lenses 92, 94 and 96 modify the beam to produce the desired beam cross-section as described above. Additional optical components, such as an optical scanner 95, may be mounted to the laser head 23, as shown in FIG. 23. The scanner 95 can be an acoustic-optic cell, motor driven rotating mirror, or a vibrating mirror scanner such as a galvanometer or tuning fork. With the proper positioning of the scanner and an addition mirror (not shown) to bend the beam in the direction of the beam exiting the scanner cable desired.

One possible embodiment for holding the lens is illustrated. The beam redirection device 88 is attached (e.g., with screws) to mirror housing assembly 65 and the beam diameter adjustment optics 92, 94, 96 and associated mounts are attached to the laser head 23. The adjustment of the distances between the lenses 92, 94, and 96 is used to obtain a circular beam. The amount of the adjustment to obtain the desired beam shape is dictated by the curvature selected for the lens as is well known in the art. The laser beam shape is thus adjusted until it matches the aperture of the optical scanner module 95 which is also mounted on the laser housing. A cover can be provided between the beam redirection device 88 and the scanner to keep dust and water out of the laser beam path between the beam redirection device 88 and the scanner. Other embodiments may consist of the lens mounted within outer sliding cylindrical tubes (not shown) which in turn are mounted to the laser head. The sliding of the tubes will adjust the distance between the lens to obtain the desired diameter adjustment of the beam.

The 180° beam redirection device 88 is needed to redirect the laser output beam from one of the mirror housing assemblies 65 to be parallel to one of the long surfaces of the laser head 23 as shown in FIG. 23. This beam redirection device is shown in detail in FIGS. 24–32. The beam redirection device 88 contains two 45° positioning mirror mounts 100 and 102. Each mirror mount 100 and 102 includes a mirror 104. The laser beam is output from the mirror housing assembly 65, enters opening 106 formed in the beam redirection device, reflects off mirror mounts 100 and 102 and exits through opening 108.

For the "bow-tie" ("figure eight") waveguide laser of FIG. 11, the beam redirection module 88 contains the two 45° mirror mounts 100 and 102 and a third mirror mount 110 having a hole 112 and a feedback mirror 114 (analogous to feedback mirror 52) which is required to produce unidirectional operation for the "bow-tie" ("figure eight") shaped waveguide laser depicted in FIG. 11. The third mirror mount 110 is positioned in the second opening 108.

Adjustment of the mirror mounts 100 and 102 is achieved, in one embodiment, by including a rubber O-ring around the set screws holding the mirror mount 100 and mirror mount 102 to the beam redirection device housing 116. Counter-rotating set screws are used to lock the mirror position in place after final adjustment. A small amount of adhesive can also be used to lock the mirror position in place after final adjustments for mirror mounts 100 and 102 to ensure proper alignment is maintained.

Referring to FIGS. 31 and 32, third mirror mount 110 containing the hole 112 from which the laser beam exits the beam redirection device 88 is shown. FIG. 31 also shows the feedback mirror 114 which causes the "bow-tie" waveguide (shown in FIG. 11) to operate in a unidirectional manner. The mechanism for adjusting the third mirror mount 110 is similar to that used on the mirror mounts 100 and 102. Rubber O-rings inserted around set screws are used to adjust the mirror for unidirectional operation. The alignment is performed by an alignment procedure using as many as four diffraction limited visible He—Ne laser for example. Once adjusted, counter-rotating set screws are again used to lock the unidirectional mirror in place. Again, an adhesive can also be used for locking the mirror 114 in place to ensure proper alignment is maintained.

The present invention provides improvements to several components of an RF excited laser. The invention has been described above primarily with reference to a Z fold waveguide. It is understood that the advantages of the present invention can be achieved with a variety of waveguide configurations including W or WI (NV) fold, and other multipath configurations. Accordingly, the improved RF laser components of the present invention are not limited to Z fold waveguides.

Figure 38:
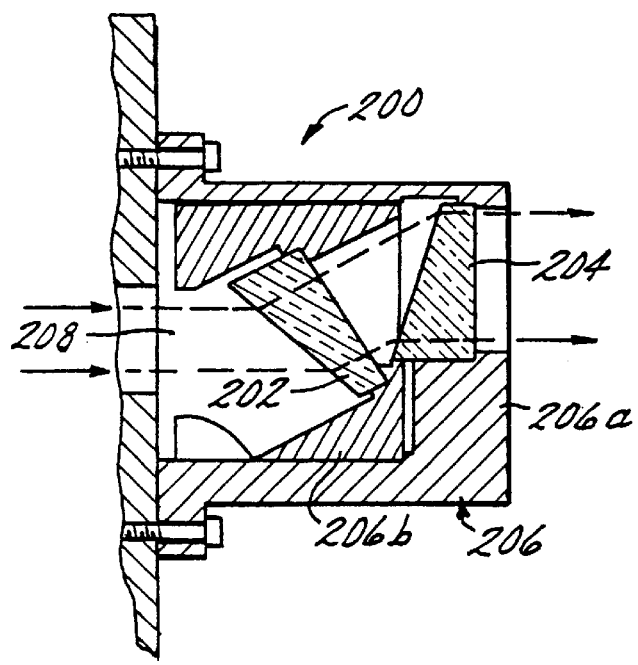
FIG. 38 is a side view of an anamorphic laser beam expander for converting a rectangular laser beam into a circular beam in a short distance, in accordance with present invention.

For many applications, a more compact and still inexpensive optical beam correction approach is desired than the one discussed so far in this disclosure. Referring to FIG. 38, such compactness and low cost can be accomplished by an anamorphic beam expander 200 using two simple prisms 202, 204 contained in a simple two-piece holder 206, as shown in the side cross sectional view. Prism 204 is inserted into a holder 206a and prism 202 is inserted into a holder 206b. Holder 206b is inserted into holder 206a as is shown. Holder 206b is rotated until the prisms 202, 204 are properly aligned (as shown) and then locked into place by pressure screws (not shown) or by other appropriate alignment holding mechanism. Each of the two prisms are designed with the required wedge angle to correct for one of the diffraction angles of x and y axis of the laser beam and fabricated from appropriate optical materials for transmitting the laser wavelength of interest. For $CO_2$ lasers, ZnSe is one acceptable prism material. Prism 202 is fabricated and positioned so that it increases the divergence of the vertical portions of the rectangular laser beam 208 emitted by the transmitting mirror assembly of FIG. 16 so that at the surface of prism 204, the vertical dimension of the laser beam is equal to the horizontal dimension portion of the laser beam. At this location the laser beam is circular. The wedge angle of prism 204 is selected and positioned so that this circular beam is maintained from the exit of the anamorphic beam expander module onward. This is accomplished by selecting the wedge angle of prism 204 so that it reduces the divergence of the vertical portion of the beam to match the divergence of the horizontal portion of the beam. The attractiveness of this approach is evident by noting that by bolting module 200 to the output mirror assembly of the laser head, the length of the laser head is increased by only approximately 2.54 cm, in this example. Consequently, this approach is more compact than the cylindrical lens approach described earlier but results in a slightly higher cost.

FIGS. 33 and 34 illustrate a ceramic structures into which a W (or M), FIG. 33 and WI (or NV), FIG. 34, shaped waveguide structures are respectively machined at an oblique angle, θ as per FIG. 17 (or per FIG. 5) for the gas discharge gain region of the gas laser in place of the Z (FIG. 9) or "bow-tie" ring (FIG. 11) configurations. Since the W waveguide has one end containing 3 mirrors and that the WI (or NV) structure requires 3 mirrors on each end, performing the 3-axis adjustments and/or alignments of the center mirror of the 3 mirrors as per the procedure/description presented for FIGS. 13, 14 and 15 is difficult because the mirrors are too close together to provide the 3-axis screw adjustments to the tiltable post holding the reflective center mirror.

Figure 36:
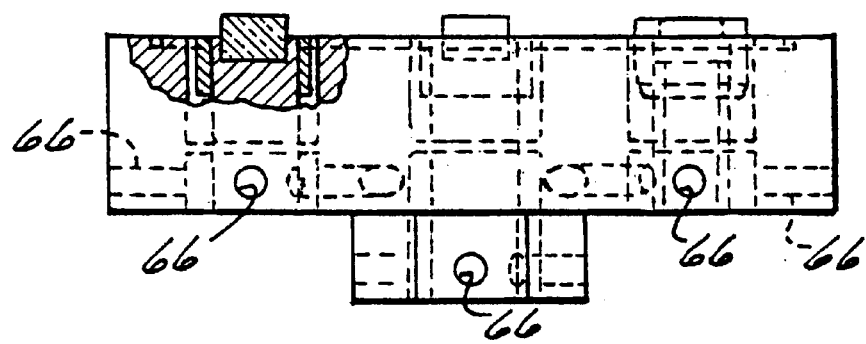
FIG. 36 is a top view of the mirror housing of FIG. 35.
Figure 35:
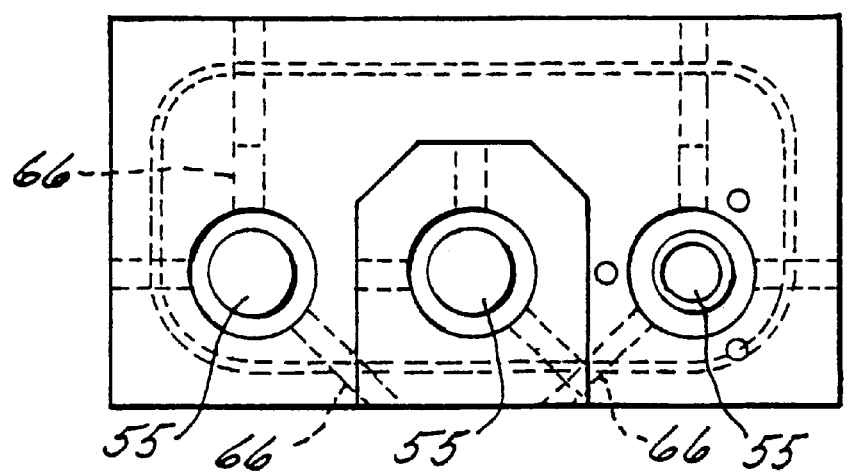
FIG. 35 is a rear view of a mirror housing assembly in accordance with the present invention for a three mirror end of a W (FIG. 33) or both ends of a WI or NV (FIG. 34) shaped waveguide configuration.

FIGS. 35 and 36 illustrate a solution to this problem. The mirror assembly holder of at least one of the optical mounts 55 (FIGS. 12–15) is extended. In this example, the center mount is extended by a longer post. Access to set screws 66 is clearly available (FIG. 36), whereby the mirror can be adjusted described hereinbefore. Alternatively, a wider laser configuration could be employed resulting in more clearance between the set screws. This can be extended to waveguide lasers consisting of two or more W waveguides connected together.

Each time an RF (radio frequency) pulse is applied to the waveguide, the gain medium rises in temperature and expands. The expanding gas within the waveguide channels expands out of the waveguide channels into the ballast volume within the laser housing 24 until a steady state uniform pressure is reached. As the pulse-rate-frequency of the RF approaches the acoustic-resonant-frequency of the gas column within the waveguide channel, a standing pressure wave builds within the channel and creates a non-uniform pressure variation along the waveguide channels. This non-uniformity in pressure can cause the discharge to extinguish in the center region of the length of the channels. This in turn results in a more intensive gas discharge toward the ends of the channels where the pressure is lower. This non-uniformity in discharge excitation of the gas causes a dramatic fall-off in laser power output as well as in other laser performances, such as a variation in peak power from pulse to pulse, power beam quality, lower efficiency, etc.

The frequency at which acoustic resonance occurs as well as the strength of the adverse effect on the lasers performance are dependant on several factors including the gas composition and pressure, the length and diameter of the waveguide channels and the peak power and duty cycle of the electrical pulses. For example, in a 45 cm length of waveguide channel consisting of either an N or NV wavelength, the acoustic resonance point lies in the 800 to 900 Hz. (fundamental), 1600 to 1800 Hz. (second harmonic), 2400 to 2700 Hz. (third harmonic) range, etc.

The adverse effects of the acoustic resonance's on laser performances are eliminated by introducing openings at locations where the gas pressure peak occurs for the fundamental and second harmonic resonance's, i.e., at L/4, L/2 and 3L/4 from one end of the waveguide channel of length, L. Such gas pressure release openings can be formed by cutting narrow slots (described below) across the entire width of the ceramic waveguide on the same ceramic surface where the waveguides are placed. The slots have the additional beneficial effects of enhancing the electrical interconnection between all the arms of the waveguide thereby, making the starting of the laser discharge much easier and reducing the time jitter in starting the laser. In addition, the extra openings allow for additional gas exchange between the ballast volume and the gas within the waveguide. This gas exchange effect also enhances the laser's overall performance.

Figure 40:
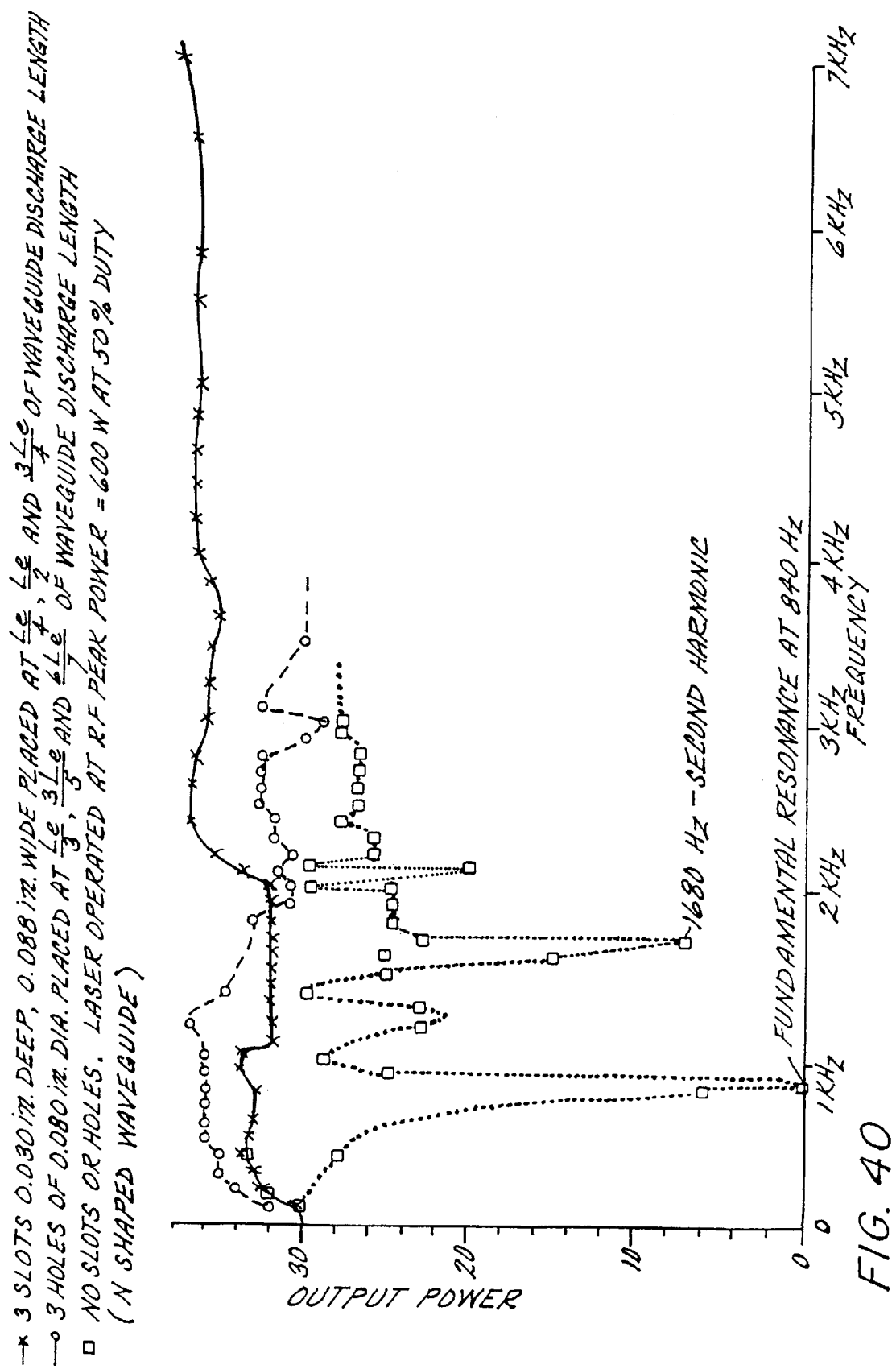
FIG. 40 is a plot of laser output power as a function of frequency, in accordance with the present invention.

It has been found, with both N and NV waveguides, that placing gas vent openings at the peak of the fundamental and second harmonic acoustic resonance is, in most cases, sufficient to eliminate the acoustic resonance adverse effects. A large number of holes are generally not needed. Referring to FIG. 40, data showing the large variation in output power that occurs when the repetition rate of the RF pulse driving the laser is varied from 50 Hz. to 7000 Hz. is shown. For an N wavelength that has an overall length of $L_w$=18.7 inches, this is also approximately the same length for one arm of the N waveguide, without the ceramic covers 48 of FIG. 9 and 10, the length $L_e$ of the waveguide covered by the Titanium electrode (i.e., an enclosed portion of the waveguide channel) determines the acoustic resonances. For the present example, the waveguide length $L_e$=14.12 inches which is the portion covered by the Titanium electrode. FIG. 40 illustrates the strong resonance's that occur at 840 Hz. and 1680 Hz. as evident by the squared data points for the typical ceramic waveguide configuration under test. The large fluctuation in output power that occurs as the pulse repetition frequency varies above, at, or below the acoustic resonance frequency is clearly evident at the fundamental and second harmonic resonances.

Figure 41:
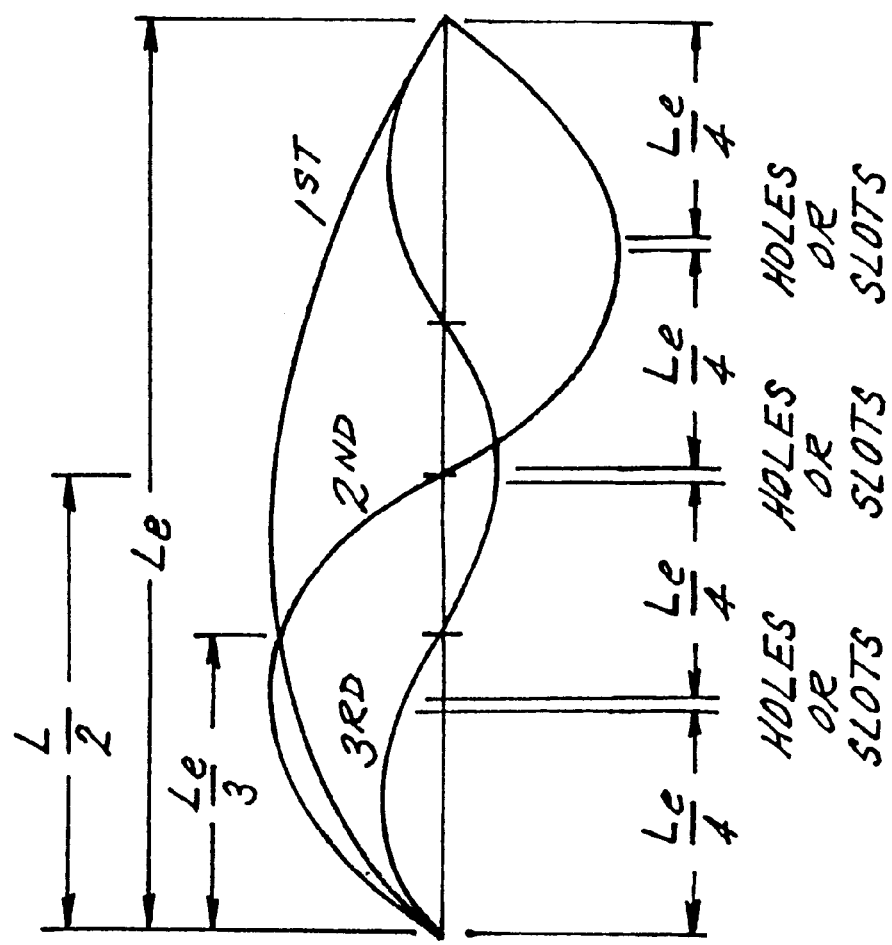
FIG. 41 is a waveform plot showing acoustic harmonics of the laser waveguide channels, in accordance with the present invention.

Referring to FIG. 41, typical pressure variations for the fundamental, second harmonic and third harmonic acoustic resonance's are illustrated. The maximum pressure occurs at L/2 for the fundamental and at $L_e$/4 and 3L/4 for the second harmonic. Placing vent openings at these locations were found to prevent these strongest resonance's from building up and affecting the laser performance. In addition, it was found that the third harmonic did not build up because it has a maximum pressure point at $L_e$/2 where a vent opening is placed to dampen the fundamental resonance. Consequently, the $L_e$/2 opening also serves to illuminate the third harmonic resonance. If the fourth or higher acoustic harmonics are a problem with other laser waveguide configurations, the foregoing can also be applied to eliminate those higher frequency resonances.

Figure 42:
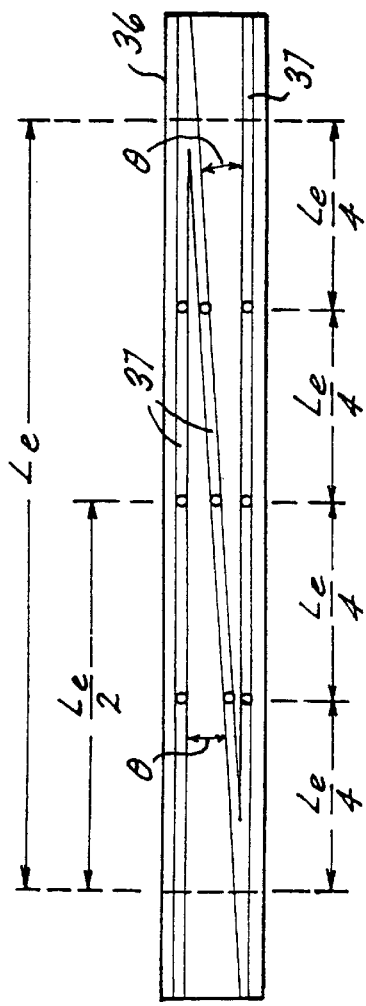
FIG. 42 is a top view of a waveguide having gas pressure vent holes in accordance with the present invention.

Referring to FIG. 42, one example of vent holes 100a–c placement within each channel 37 of the waveguide 36 as discussed above. It is important not to make the vent opening larger than the size required to dampen the acoustic resonance down to the amount desired as too large an opening will generate a lower impedance for the discharge from the top electrode 38 (FIG. 8) down through the vent hole to the bottom electrode 32. This would cause a hot spot to be generated at the location of the discharge and cause a loss in laser efficiency.

Placing vent holes 100 through the top of the ceramic waveguide 36 requires corresponding holes to be placed in the upper electrode 38 and in some cases through the ceramic spacer 28. These multiple part openings need to be aligned during the assembly process so as not to block the pressure release vent. In addition, the aluminum electrode 38 is exposed to the discharge which can cause particulates to be deposited into the waveguide, as discussed hereinbefore. These particulates can cause mirror damage when propelled out of the waveguide when heated by the laser beam and eventually striking one of the laser feedback cavity mirrors.

Figure 43:
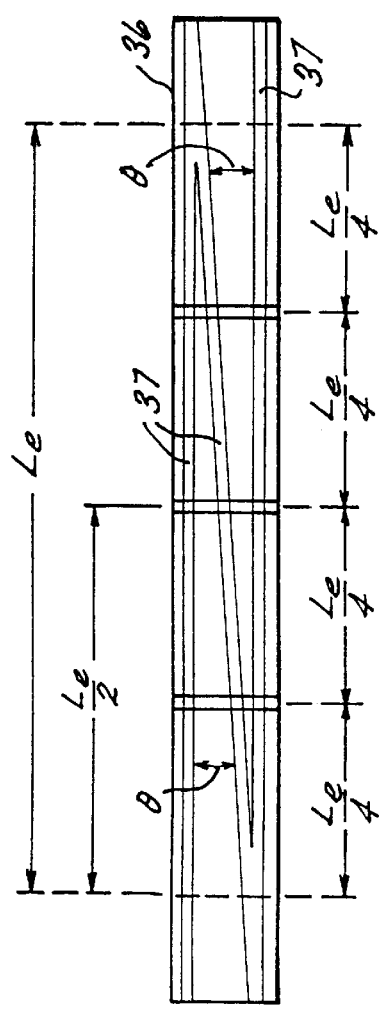
FIG. 43 is a bottom view of a waveguide having gas pressure relief slots in accordance with the present invention.

Referring to FIG. 43, it may therefore be preferred that shallow and narrow cuts 102a–c (or slots) across the bottom surface of the ceramic waveguide 36 at the referenced hole locations from one end of the structure, which leads to easier assembly and also yields the same desired results. The X data points of FIG. 40 shows the output power variation with RF pulse repetition rate driving the laser discharge while maintaining a constant 50% power duty when 0.03 inch deep and 0.088 inch wide slots were cut across the bottom of the ceramic waveguide structure as shown in FIG. 43. This pressure release cut opening is in contact with the bottom Titanium electrode 32, which in turn is in electrical and thermal contact with the Aluminum housing 24, which acts as an electrical ground.

Similar results are obtained with shallow and narrow slots across the NV ceramic waveguide structure of FIG. 34 and other configurations. The present invention is applicable to all enclosed laser discharge configurations which experience adverse laser performance effects when the pulse repetition rate of the electrical pulse energizing the laser discharge overlaps the acoustic resonance of the laser's enclosed gas discharge column. Such adverse acoustic resonance effects can occur with either RF or dc electrical pulses driving enclosed laser discharge columns. This invention thus has broad applications to pulsed gas lasers.

Prime numbers are numbers that are not divisible by any other numbers except 1 and by itself, i.e., 1, 3, 5, 7, 11, 13, etc. Similar results are obtained by placing vent openings at selected prime number locations such as along the length of the waveguide at $nL_e/3$, $nL_e/5$, $nL_e/7$, etc., where n is a integer 1, 2, 3, 4, 5, etc., representing the half wavelength of the acoustic resonance. The data shown by the circular holes on FIG. 40 resulted with holes placed at $L_e/3$, $3L_e/5$, $6L_e/7$. The hole diameters were 0.080 inches. In all cases the RF peak power was maintained at 600 W and the duty cycle of the pulse train was maintained at 50% of the CW power.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A waveguide laser comprising:
   a housing;
   a waveguide positioned within said housing;
   first and second electrodes positioned at opposing surfaces of said waveguide; and
   a resilient member applying a compression force on said waveguide and said first and second electrodes within said housing and providing a low inductance electrical connection to said housing.

2. The waveguide laser of claim 1 wherein said resilient member comprises a c-shaped spring.

3. The waveguide laser of claim 2 wherein said c-shaped spring is positioned within said housing between one of said first and second electrodes and said housing.

4. A waveguide laser comprising:
   a waveguide;
   first and second electrodes positioned at opposing surfaces of said waveguide wherein said waveguide extends a prescribed distance beyond said first and second electrodes for preventing electrical arcing between the first and second electrodes; and
   first, second, third and fourth waveguide channels defined in said waveguide, said first and third waveguide channels intersecting at a first intersection region, said second and third waveguide channels intersecting at a second intersection region, said first and fourth waveguide channels intersecting at a third intersection region, said second and fourth waveguide channels intersecting at a fourth intersection region, said third and fourth waveguide channels intersecting at a fifth intersection region.

5. The waveguide laser of claim 4 wherein said first electrode is positioned on said waveguide at said first, second, third and fourth waveguide channels with said first electrode extending over a first portion of said first, second, third, fourth and fifth intersection regions; and
   a first cover positioned on said waveguide over a second portion of said first and fourth intersection regions;
   a second cover positioned on said waveguide over a second portion of said second and third intersection regions; and
   a third cover positioned on said waveguide over a second portion of said fifth intersection region.

6. The waveguide laser of claim 5 wherein said first, second and third covers are comprised of a ceramic.

7. The waveguide laser of claim 4 wherein said waveguide is comprised of a ceramic.

8. The waveguide laser of claim 4 wherein said second electrode is comprised of titanium, titanium-aluminide alloy, gold or platinum.

9. The waveguide laser of claim 4 wherein said first, second, third and fourth waveguide channels have an aspect ratio of greater than one-by-one.

10. The waveguide laser of claim 9 wherein said first, second, third and fourth waveguide channels have an aspect ratio of about one-by-two.

11. The waveguide laser of claim 5 wherein said first, second, third and fourth waveguide channels have a width and said first portion of said first, second, third, fourth and fifth intersection regions comprises a distance about equal to said width.

12. The waveguide laser of claim 4 wherein said third waveguide channel forms an oblique angle with said first and second waveguide channels, and said fourth waveguide channel forms an oblique angle with said first and second waveguide channels.

13. A waveguide laser comprising:
    a housing;
    a waveguide positioned within said housing;
    first and second electrodes positioned at opposing surfaces of said waveguide;
    at least one waveguide channel defined in said waveguide; and
    an optical mount disposed at said housing and positioned relative to said waveguide channel, said optical mount comprising,
    a post,
    an optical component positioned at an end of said post, and
    a compression ring mounted on said post for ring applying force radially towards said optical component.

14. The waveguide laser of claim 13 further comprising a plurality of spaced apart tabs extending away from said post and positioned between said optical component and said compression ring.

15. The waveguide laser of claim 13 wherein said optical mount further comprises:
    a threaded adjustment engaging said post at a plurality of points to provide for angular alignment of said optical component.

16. The waveguide laser of claim 15 further comprising a plurality of said optical mounts with at least one of said optical mounts being extended to provide access to said threaded adjustment for each of said optical mounts.

17. A waveguide laser comprising:
    a housing;
    a waveguide positioned within said housing;
    first and second electrodes positioned at opposing surfaces of said waveguide; and
    at least two waveguide channels defined in said waveguide; and
    a plurality of beam redirection devices mounted to said housing for receiving a laser beam emitted from one of said waveguide channels and directing the laser beam into another of said waveguide channels, wherein the position of each beam redirection device relative to the at least two waveguide channels is individually controllable independent of the remaining beam redirection devices.

18. The waveguide laser of claim 17 wherein said beam redirection device further includes:

first and second mirrors each mounted at an angle of about 45° relative to a longitudinal axis of respective said waveguide channels, said first mirror being disposed at an angle of about 90° relative to said second mirror.

19. The waveguide laser of claim 18 wherein said beam redirection device includes an opening therein positioned for outputting the laser beam and a third mirror mounted to feedback the laser beam.

20. A waveguide gas laser comprising:

a housing;

a waveguide positioned within said housing;

first and second electrodes positioned at opposing surfaces of said waveguide;

at least one waveguide channel defined in said waveguide; and an optical beam correction device mounted to said housing for changing the cross-sectional shape of a laser beam emitted from said waveguide channel, said optical beam correction device including,
first and second prisms positioned in a spaced apart relationship for converting a generally rectangular laser beam into a generally circular laser beam.

21. A laser waveguide including at least one waveguide channel defined therein, said waveguide channel having an aspect ratio of about one-by-two.

22. A waveguide laser comprising:

a waveguide;

first and second electrodes positioned at opposing surfaces of said waveguide; and first, second, third and fourth waveguide channels defined in said waveguide, said first and third waveguide channels obliquely intersecting at an angle of approximately three to fifteen degrees at a first intersection region, said second and third waveguide channels obliquely intersecting at an angle of approximately three to fifteen degrees at a second intersection region, said second and fourth waveguide channels obliquely intersecting at an angle of approximately three to fifteen degrees at a third intersection region.

23. The waveguide laser of claim 22 further comprising:

a fifth waveguide channel defined in said waveguide, said fourth and fifth waveguide channels intersecting at a fourth intersection region.

24. The waveguide laser of claim 22 wherein said first, second, third and fourth waveguide channels have an aspect ratio of greater than one-by-one.

25. The waveguide laser of claim 24 wherein said first, second, third and fourth waveguide channels have an aspect ratio of about one-by-two.

26. The waveguide laser of claim 22 wherein said first electrode is positioned on said waveguide at said first, second, third and fourth waveguide channels with said first electrode extending over a first position of said first, second and third intersection regions.

27. The waveguide laser of claim 26 further comprising:

a first cover positioned on said waveguide over a second portion of said first and third intersection regions; and a second cover positioned on said waveguide over a second portion of said second intersection region.

28. The waveguide laser of claim 27 wherein said first and second covers are comprised of a ceramic.

29. The waveguide laser of claim 22 wherein said waveguide is comprised of a ceramic.

30. The waveguide laser of claim 22 wherein said second electrode is comprised of titanium, titanium-aluminide alloy, gold or platinum.

31. The waveguide laser of claim 26 wherein said first, second, third and fourth waveguide channels have a width and said first portion of said first, second and third intersection regions comprises a distance about equal to said width.

32. The waveguide laser of claim 22 wherein said third waveguide channel forms an oblique angle with said first and second waveguide channels.

33. A waveguide laser comprising:

a waveguide; and first and second electrodes positioned at opposing surfaces of said waveguide, one of said first and second electrodes comprises of titanium, titanium-aluminide alloy, gold or platinum.

34. A waveguide laser comprising:

a waveguide;

first and second electrodes positioned at opposing surfaces of said waveguide; and at least one waveguide channel defined in said waveguide, said wave-guide channel having an aspect ratio of greater than one-by-one.

35. The waveguide laser of claim 34 wherein said waveguide channel has an aspect ratio of about one-by-two.

36. The waveguide laser of claim 35 further comprising:

a lens positioned relative to said waveguide for maintaining the roundness of a beam exiting said waveguide channel by converging a wider portion of the beam to the narrower portion of the beam.

37. The waveguide laser of claim 34 further comprising:

a two lens telescope positioned relative to said waveguide for changing a diameter of a beam exiting said waveguide channel.

38. A waveguide laser comprising:

a waveguide;

first and second electrodes positioned at opposing surfaces of said waveguide; and at least one waveguide channel defined in said waveguide, said waveguide having at least one opening at one of said surfaces of said waveguide leading to said at least one waveguide channel, said at least one opening being positioned at about a location corresponding to about a pressure peak of an acoustic resonance of said at least one waveguide channel.

39. The waveguide laser of claim 38 wherein said acoustic resonance comprises a fundamental acoustic resonance or a harmonic acoustic resonance.

40. The waveguide laser of claim 38 wherein said at least one opening comprises three openings located at one-half the length of an enclosed portion of said at least one channel, at one-quarter the length of the enclosed portion of said at least one channel and at three-quarters the length of the enclosed portion of said at least one channel.

41. The waveguide laser of claim 38 wherein said at least one opening comprises a plurality of openings located at $nL_e/PN$ where, n is an integer, $L_e$ is the length of an enclosed portion of said at least one channel, and PN is a prime number.

42. A waveguide laser comprising:

a waveguide;

first and second electrodes positioned at opposing surfaces of said waveguide; and at least one waveguide channel defined in said waveguide, said waveguide having at least one slot at one of said surfaces of said waveguide intersecting said at least one waveguide channel, said at least one slot being positioned at about a location corresponding to about a pressure peak of an acoustic resonance of said at least one waveguide channel.

43. The waveguide laser of claim 42 wherein said acoustic resonance comprises a fundamental acoustic resonance or a harmonic acoustic resonance.

44. The waveguide laser of claim 42 wherein said at least one slot comprises three slots located at one-half the length of an enclosed portion of said at least one channel, at one-quarter the length of the enclosed portion of said at least one channel and at three-quarters the length of the enclosed portion of said at least one channel.

45. The waveguide laser of claim 42 wherein said at least one slot comprises a plurality of slots located at $nL_e/PN$ where, n is an integer, $L_e$ is the length of an enclosed portion of said at least one channel, and PN is a prime number.

46. A waveguide laser comprising:

a waveguide;

first and second electrodes positioned at opposing surfaces of said waveguide; and first, second and third waveguide channels defined in said waveguide, said first and third waveguide channels obliquely intersecting at an angle of approximately three to fifteen degrees at a first intersection region, said second and third waveguide channels obliquely intersecting at an angle of approximately three to fifteen degrees at a second intersection region;

said first electrode being positioned on said waveguide at said first, second and third waveguide channels with said first electrode extending over a first portion of said first and second intersection regions;

a first cover positioned on said waveguide over a second portion of said first intersection region; and a second cover positioned on said waveguide over a second portion of said second intersection region.

47. The waveguide laser of claim 46 wherein said waveguide is comprised of a ceramic.

48. The waveguide laser of claim 46 wherein said second electrode is comprised of titanium, titanium-aluminide alloy, gold or platinum.

49. The waveguide laser of claim 46 wherein said first, second and third waveguide channels have an aspect ratio of greater than one-by-one.

50. The waveguide laser of claim 49 wherein said first, second and third waveguide channels have an aspect ratio of about one-by-two.

51. The waveguide laser of claim 46 wherein said first, second and third waveguide channels have a width and said first portion of said first and second intersection regions comprises a distance about equal to said width.

52. The waveguide laser of claim 46 wherein said third waveguide channel forms an oblique angle with said first and second waveguide channels.

53. The waveguide laser of claim 1 wherein said resilient member is comprised of gold plated beryllium copper.

54. A waveguide laser comprising:

a waveguide;

first and second electrodes positioned at opposing surfaces of said waveguide;

first, second and third waveguide channels defined in said waveguide, said first and third waveguide channels intersecting at a first intersection region, said second and third waveguide channels intersecting at a second intersection region;

said first electrode being positioned on said waveguide at said first, second and third waveguide channels with said first electrode extending over a first portion of said first and second intersection regions;

a first ceramic cover positioned on said waveguide over a second portion of said first intersection region; and a second ceramic cover positioned on said waveguide over a second portion of said second intersection region.

* * * * *